United States Patent
Bilal et al.

(10) Patent No.: US 10,819,823 B2
(45) Date of Patent: Oct. 27, 2020

(54) APPARATUS AND METHOD FOR IN-NETWORK CACHING

(71) Applicant: ELECTRONICS AND TELECOMMUNICATIONS RESEARCH INSTITUTE, Daejeon (KR)

(72) Inventors: Muhammad Bilal, Daejeon (KR); Shin-Gak Kang, Sejong-si (KR); Wook Hyun, Daejeon (KR); Sung-Hei Kim, Daejeon (KR); Ju-Young Park, Daejeon (KR); Mi-Young Huh, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 230 days.

(21) Appl. No.: 15/667,792

(22) Filed: Aug. 3, 2017

(65) Prior Publication Data
US 2018/0288185 A1    Oct. 4, 2018

(30) Foreign Application Priority Data
Apr. 3, 2017  (KR) .................. 10-2017-0042936

(51) Int. Cl.
*H04L 29/08* (2006.01)
*G06F 12/122* (2016.01)
*G06F 12/126* (2016.01)

(52) U.S. Cl.
CPC ........ *H04L 67/2852* (2013.01); *G06F 12/122* (2013.01); *G06F 12/126* (2013.01);
(Continued)

(58) Field of Classification Search
CPC ..... H04L 67/2852; H04L 67/02; H04L 67/32; H04L 69/329; G06F 12/122; G06F 12/126; G06F 2212/314
See application file for complete search history.

(56) References Cited

U.S. PATENT DOCUMENTS 5,860,110 A * 1/1999 Fukui .................. G06F 12/0804
                                                        711/141
9,318,223 B2 * 4/2016 Wu ...................... G11C 11/5642
(Continued)

FOREIGN PATENT DOCUMENTS

KR    10-2015-0080957    7/2015

*Primary Examiner* — James R Sheleheda
*Assistant Examiner* — Franklin S Andramuno
(74) *Attorney, Agent, or Firm* — Kile Park Reed & Houtteman PLLC

(57) ABSTRACT

Disclosed herein are an in-network caching apparatus and method. The in-network caching method using the in-network caching apparatus includes receiving content from a second node in response to a request from a first node; checking a Conditional Leave Copy Everywhere (CLCE) replication condition depending on a number of requests for the content; checking a priority condition based on a result value of a priority function for the content; checking a partition depending on the number of requests for the content; performing a cache replacement operation for the content depending on a result of checking the partition for the content; and transmitting the content to the first node.

18 Claims, 6 Drawing Sheets

(52) U.S. Cl.
CPC ........ *G06F 2212/314* (2013.01); *H04L 67/02* (2013.01); *H04L 67/32* (2013.01); *H04L 69/329* (2013.01)

(56) References Cited

U.S. PATENT DOCUMENTS

| | | |
|---|---|---|
| 2003/0115346 A1 | 6/2003 | McHenry et al. |
| 2005/0108481 A1* | 5/2005 | Iyengar ............... G06F 12/0817 711/141 |
| 2008/0229025 A1* | 9/2008 | Plamondon ......... G06F 12/0862 711/126 |
| 2013/0215756 A1 | 8/2013 | Jeon et al. |
| 2013/0227048 A1 | 8/2013 | Xie et al. |
| 2013/0268520 A1* | 10/2013 | Fisher .................. G06F 16/248 707/723 |
| 2014/0020102 A1 | 1/2014 | Srinivasan et al. |
| 2016/0112535 A1 | 4/2016 | Sung |
| 2018/0027040 A1* | 1/2018 | Bae ...................... H04N 21/238 709/231 |
| 2018/0167318 A1* | 6/2018 | Srinivasan ............ H04L 45/741 |
| 2018/0203807 A1* | 7/2018 | Krueger ............. G06F 12/0875 |

* cited by examiner

FIG.4

$P(c_i) = f_0 \circ f_1 \circ f_2 \cdots \circ f_k$ if $\hat{\tau}_j(i) \geq \min(N_{ALFU}) \wedge P(c_i) \geq P(\min(N_{ALFU}))$ for $c_i \notin C_j$ // CLCE replication condition and priority check if $\min(N_{ALFU}) \leq \hat{\tau}_j(i) \leq \max(N_{ALFU})$ $C_{ALFU} = (C_{ALFU} - c_{min}) \cup c_i$ //Partition selection condition-1 else if $\hat{\tau}_j(i) > \max(N_{ALFU})$ $\in_0 = |N_{LRU}^k - \hat{\tau}_j(i)| \; \forall \, k = 1,2,..K$ //Partition selection condition-2 insert in sub-partition with smallest $\in_0$ $C_{ALFU} = (C_{ALFU} - c_{min}) \cup c_i$ $C_{LRU}^k = (C_{LRU}^k - c_{least}^k) \cup c_i$ else Forward the content without caching

APPARATUS AND METHOD FOR IN-NETWORK CACHING

CROSS REFERENCE TO RELATED APPLICATION

This application claims the benefit of Korean Patent Application No. 10-2017-0042936, filed Apr. 3, 2017, which is hereby incorporated by reference in its entirety into this application.

BACKGROUND OF THE INVENTION

1. Technical Field

The present invention relates generally to Internet communication technology, and more particularly to in-network caching technology.

2. Description of the Related Art

In-network caching is a solution for Internet architecture. Caching in applications, such as Content Delivery Networks (CDNs), web caching, and Peer-to-Peer (P2P) networking, is designed to replicate and replace content for application-layer solutions. However, with the advent of an Information-Centric Networking paradigm, in-network caching has emerged as a network layer solution. In an Information-Centric Network (ICN) model, 'in-network content caching' is the essential part of an ICN service framework. Unlike CDNs, web caching, and P2P networking, ICN is a network layer solution, and all routers having an ICN function are responsible for storing downloaded content for a limited time. Cached content in the ICN has characteristics that differ from those of cached content in applications such as web caching or CDNs. That is, in the ICN, cached content may be more rapidly changed, and a cache has a much smaller size. Therefore, a cache replication and replacement method in the ICN must be fast and lightweight. Also, because ICN is a network-level solution, the efficiency of a caching strategy highly depends on the network. Well-known ICN architecture uses Leave Copy Everywhere (LCE) and Least Recently Used (LRU) as cache replication and replacement schemes.

The LRU scheme is the most popular scheme adopted by ICN architecture because it is simply and easily implemented and is lightweight and fast. However, the LRU scheme may not conserve information about the popularity of content.

On the other hand, the LCE scheme may conserve information about the popularity of content, but it maintains a complete history of all stored content, which causes storage of unpopular content, and thus is regarded as being impractical.

Therefore, the present invention uses a Least Frequently Recently Used (LFRU) scheme, through which an efficient cache eviction policy may be provided by combining the LRU scheme and an approximated LFU scheme.

The LFRU scheme will be again described later.

Meanwhile, Korean Patent Application Publication No. 10-2015-0080957, titled "Caching method in Content-Centric Networks based on content popularity prediction using prefix-tree", discloses a method in which the popularity of content is derived using the prefix of the content and whether the content is to be cached is determined based on the popularity.

However, Korean Patent Application Publication No. 10-2015-0080957 has limitations in that the route of content is analyzed based on the name thereof and the lifetime of content is determined using the route.

SUMMARY OF THE INVENTION

An object of the present invention is to provide a lightweight and efficient mechanism for cache replication and replacement schemes for in-network caches.

Another object of the present invention is to provide a satisfactory Internet environment to users by decreasing network traffic.

A further object of the present invention is to minimize the cost of managing and monitoring a cache network.

In order to accomplish the above objects, a method for in-network caching using an in-network caching apparatus according to an embodiment of the present invention includes receiving content from a second node in response to a request from a first node; checking a Conditional Leave Copy Everywhere (CLCE) replication condition depending on a number of requests for the content; checking a priority condition based on a result value of a priority function for the content; checking a partition for the content depending on the number of requests for the received content; performing a cache replacement operation for the content depending on a result of checking the partition for the content; and transmitting the content to the first node.

Here, a cache for the content may be divided into a privileged partition and an unprivileged partition.

Here, receiving the content may be configured to estimate a time window based on a confidence interval and an acceptable error, calculated using Chebyshev's inequality.

Here, receiving the content may be configured to use a central limit theorem in order to satisfy a tight boundary of the estimated time window.

Here, receiving the content may be configured such that, in order to improve accuracy of estimation of the time window, Newton iteration is performed on the time window, estimated using a Newton method.

Here, checking the CLCE replication condition, checking the priority condition, and checking the partition may be performed based on information such as a number of requests for content, observed during the time window.

Here, checking the CLCE replication condition may be configured such that the number of requests for the content during the time window is compared with a number of requests for least requested content, among pieces of content in the unprivileged partition.

Here, checking the CLCE replication condition may be configured such that the CLCE replication condition is satisfied when the number of requests for the content is equal to or greater than the number of requests for least requested content, among pieces of content in the unprivileged partition.

Here, checking the priority condition may be configured such that, for a specific element, the result value of the priority function for the content is compared with a result value of the priority function for content having a lowest number of requests during the time window, among pieces of content in the unprivileged partition.

Here, checking the priority condition may be configured such that the priority condition is satisfied when the result value of the priority function for the content is greater than the result value of the priority function for the content having the lowest number of requests, among pieces of content in the unprivileged partition.

Here, the result of the priority function may be defined based on a composite function generated by combining functions that are independent of each other, in which requirements of an administrator of a local network are incorporated.

Here, checking the partition may be configured to select any one of content in the privileged partition and content in the unprivileged partition, which is to be replaced with the received content.

Here, checking the partition may be configured to select any one of the privileged partition and the unprivileged partition for caching the content.

Here, checking the partition may be configured to determine whether the number of requests for the content during the time window falls within a range between a minimum value and a maximum value of a number of requests for pieces of content in the unprivileged partition. If the number of requests for the received content is greater than the maximum value of the number of requests for pieces of content in the unprivileged partition, selecting a sub-partition in the privileged partition may be performed, but if not, the cache replacement operation may be performed for replacing content in the unprivileged partition.

Here, the privileged partition may be configured with one or more sub-partitions.

Here, performing the cache replacement operation may be configured such that, when the number of requests for the content is equal to or greater than the number of requests for the least requested content among pieces of content in the unprivileged partition and when the priority of the content is higher than a priority of the least requested content, a Least Frequently Recently Used (LFRU) scheme is performed.

Here, the LFRU scheme may be configured such that a Least Recently Used (LRU) scheme is applied to the privileged partition and an Approximated Least Frequently Used (ALFU) scheme is applied to the unprivileged partition.

Here, the priority of the content may be defined based on the composite function generated by combining functions independent of each other, in which the requirements of an administrator of a local network are incorporated.

Here, performing the cache replacement operation may be configured such that, when the number of requests for the content falls within a range between a minimum value and a maximum value of a number of requests for pieces of content in the unprivileged partition, the least requested content in the unprivileged partition is replaced with the content.

Here, performing the cache replacement operation may be configured to maintain a history of access to the content within a limited time window using the ALFU scheme.

Here, performing the cache replacement operation may be configured to divide the privileged partition into multiple sub-partitions and to count a total number of observations of the sub-partitions within the time window.

Here, performing the cache replacement operation may be configured to select a sub-partition having a lowest acceptable error from among the sub-partitions of the privileged partition when the number of requests for the content is greater than a maximum number of requests for pieces of content in the unprivileged partition.

Here, performing the cache replacement operation may be configured to replace content corresponding to a minimum number of requests in the unprivileged partition with least frequently used content evicted from the sub-partition having the lowest acceptable error.

Here, performing the cache replacement operation may be configured to insert the content, corresponding to the number of requests greater than the maximum number of requests for pieces of content in the unprivileged partition, in the privileged partition from which the least frequently used content is evicted.

Here, performing the cache replacement operation may be configured such that a number of requests for the content in the time window is estimated using the number of requests for the content and a Bernoulli Random Variable for the content.

Here, performing the cache replacement operation may be configured such that content selected by performing the ALFU scheme on pieces of content cached in the unprivileged partition may be replaced with the received content.

Here, the ALFU scheme may correspond to the LFU scheme based on a history of access to content, such as information about a number of requests for the content observed during the time window.

Here, selecting a sub-partition in the privileged partition may be configured such that a sub-partition having a feature that is most similar to a feature of the received content is selected from among the sub-partitions constituting the privileged partition, and specific content stored in the selected sub-partition is replaced.

Here, the feature may correspond to a normalized value acquired by dividing a total number of requests for pieces of content stored in each sub-partition during the time window by a number of pieces of content stored in the corresponding sub-partition.

Here, replacing the specific content stored in the selected sub-partition may be configured such that least recently used content selected by performing the LRU scheme on pieces of content stored in the selected sub-partition is moved to the unprivileged partition and the received content is cached in space of the selected sub-partition, in which the least recently used content was cached.

Here, moving the least recently used content to the unprivileged partition may be configured such that content selected by performing the ALFU scheme on pieces of content stored in the unprivileged partition is replaced with the least recently used content.

Also, in order to accomplish the above objects, an in-network caching apparatus according to an embodiment of the present invention includes a content reception unit for receiving content from a second node in response to a request from a first node; a CLCE replication check unit for checking a Conditional Leave Copy Everywhere (CLCE) replication condition depending on a number of requests for the content; a priority check unit for checking a priority condition based on a result value of a priority function for the content; a partition check unit for checking a partition depending on the number of requests for the content; a cache replacement unit for performing a cache replacement operation for the content depending on a result of checking the partition for the content; and a content transmission unit for transmitting the content to the first node.

BRIEF DESCRIPTION OF THE DRAWINGS

The above and other objects, features and advantages of the present invention will be more clearly understood from the following detailed description taken in conjunction with the accompanying drawings, in which:

FIG. 4 is a view that shows an LFRU algorithm according to an embodiment of the present invention;

DESCRIPTION OF THE PREFERRED EMBODIMENTS

Figure 1:
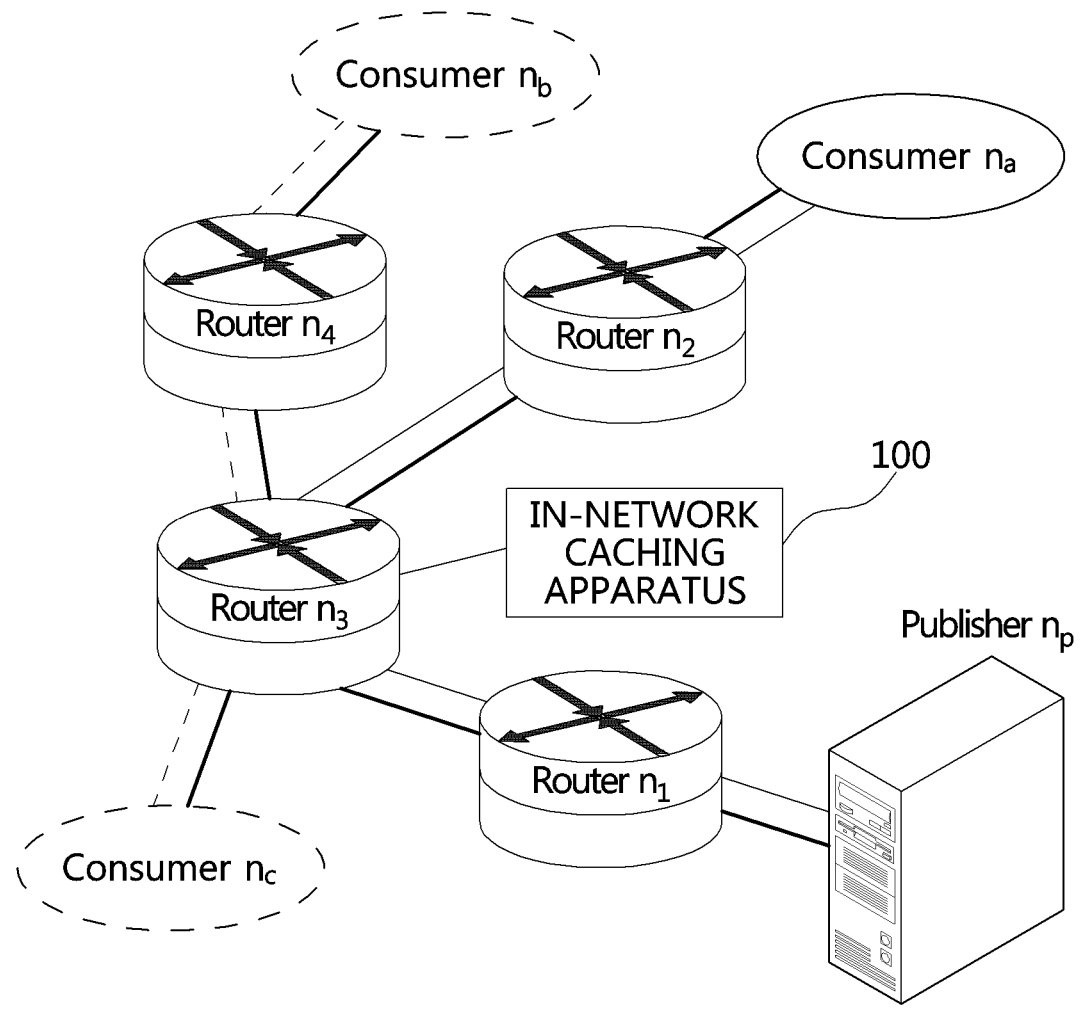
FIG. 1 is a view that shows an overview of a cache network according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising", and "includes" and/or "including" specify the presence of stated elements but do not preclude the presence or addition of one or more other elements unless otherwise specified.

Hereinafter, a preferred embodiment according to the present invention will be described in detail with reference to the accompanying drawings.

FIG. 1 is a view that shows an overview of a cache network according to an embodiment of the present invention.

Referring to FIG. 1, a Cache Network (CN) according to an embodiment of the present invention may include a total of m cache nodes and c pieces of content.

The nodes may include consumer nodes and publisher nodes.

The consumer nodes may request content from other nodes (publisher nodes), and the publisher nodes may create content and provide it to the consumer nodes.

Here, each of the consumer nodes and the publisher nodes may be a human-controlled device or an automated machine.

Content created by a publisher node may be permanent, and may be stored in at least one cache node.

Here, the content may be stored in a publisher node or another node.

Content may be temporarily cached in some selected intermediate cache nodes, for example, a Router $n_3$ illustrated in FIG. 1, based on a Conditional Leave Copy Everywhere (CLCE) replication scheme while it is being delivered to a customer.

Because a consumer node's additional request for specific content passes through another cache node, if an intermediate cache node temporarily stores and maintains a copy of content, consumer nodes may locally enjoy the content without routing to a publisher node.

As illustrated in FIG. 1, a consumer node $n_a$ may request content $c_i$ from a publisher node $n_p$ at time $t_a$. Here, the publisher node may create content and transmit it to an intermediate cache node $n_3$ in response to the request from the consumer node.

Here, an in-network caching apparatus 100 according to an embodiment of the present invention, located at the intermediate cache node $n_3$, may perform in-network caching.

When content $c_i$ is successfully delivered, the in-network caching apparatus 100 may store a copy of content $c_i$ in order to check specified CLCE replication conditions.

Accordingly, consumer nodes $n_b$ and $n_c$ may acquire the same content $c_i$ from the intermediate cache node $n_3$ without access to the publisher node $n_p$.

Therefore, the in-network caching apparatus 100 may greatly reduce the content delivery time and decrease network traffic.

The following is notations for the description of the present invention.

Figure 2:
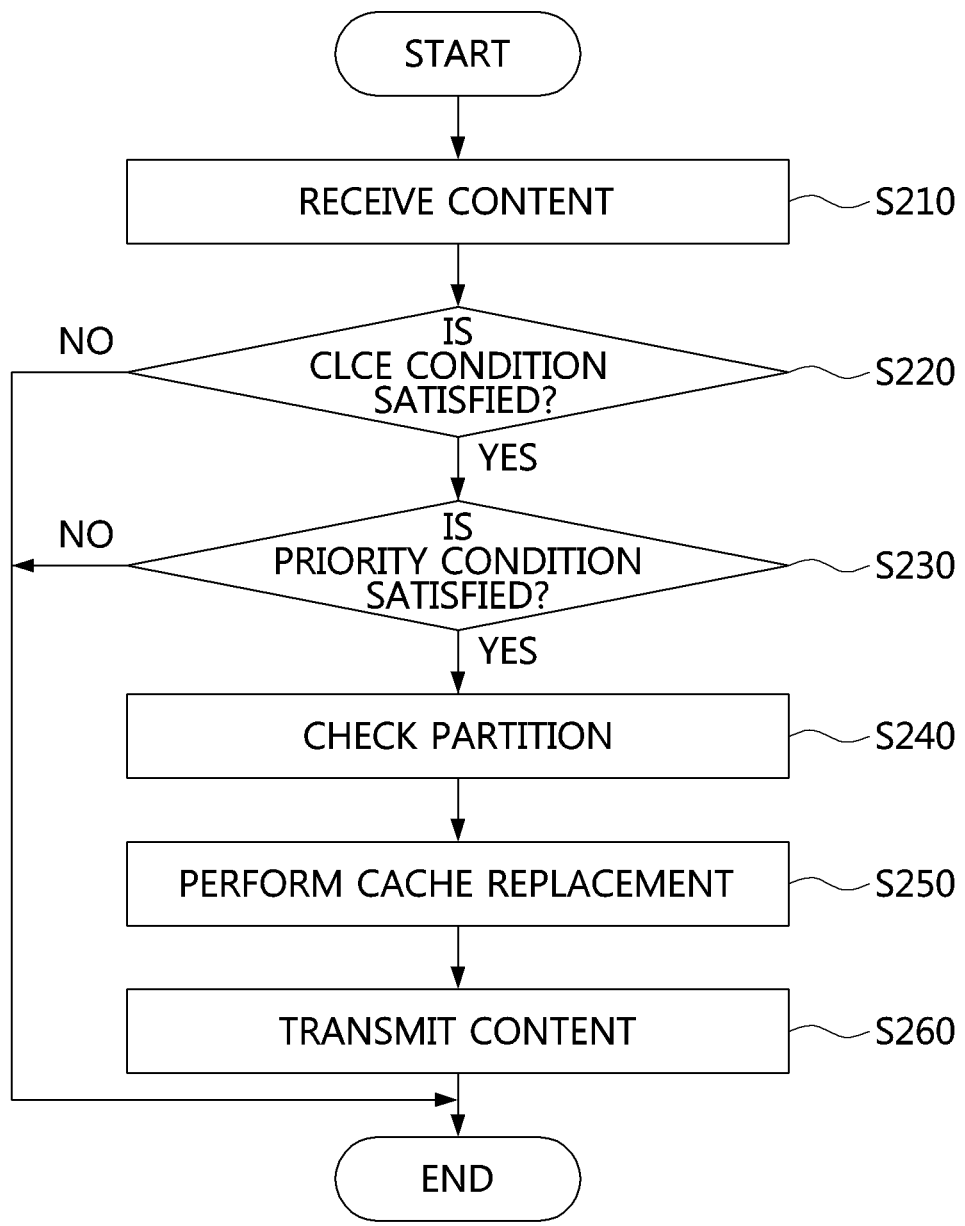
FIG. 2 is a flowchart that shows a method for in-network caching according to an embodiment of the present invention.
Figure 3:
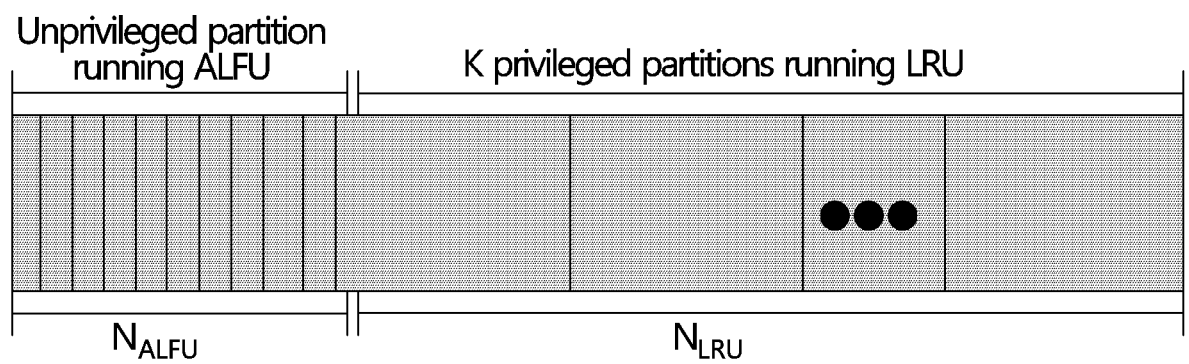
FIG. 3 is a view that shows the structure of a cache in an LFRU scheme according to an embodiment of the present invention.
Figure 5:
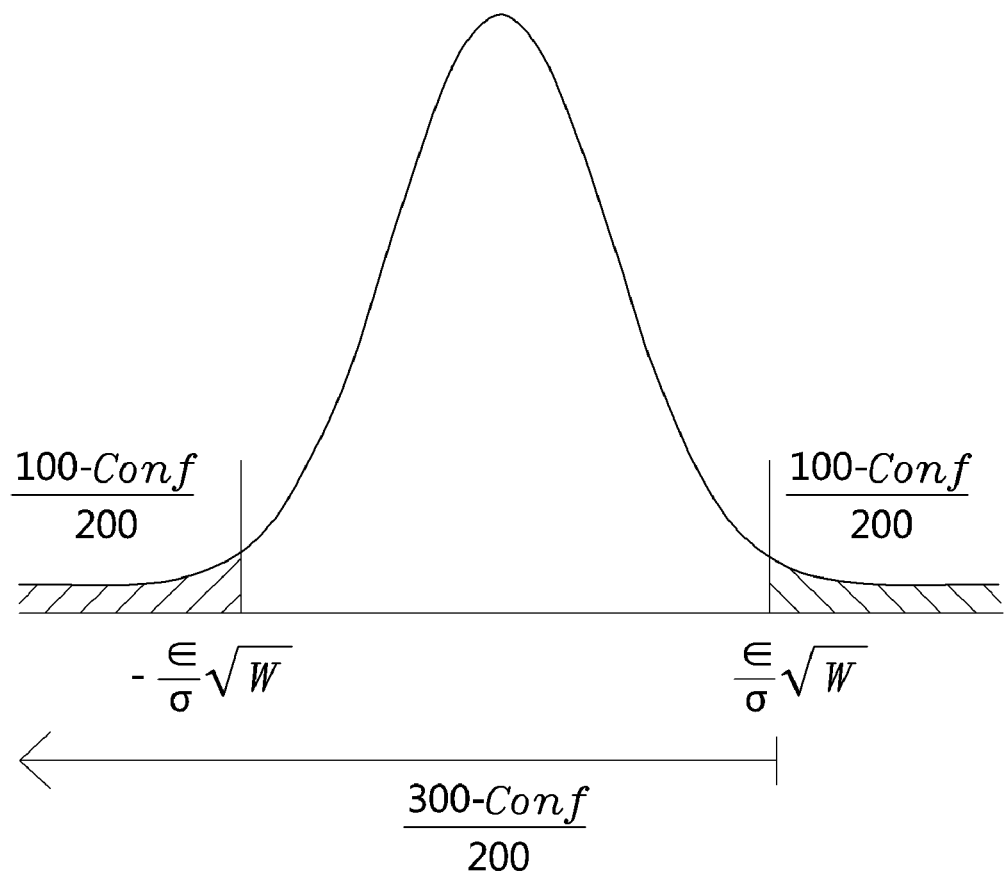
FIG. 5 is a graph that shows a probability density function of a random variable according to an embodiment of the present invention.

$N_{ALFU}$=the set value of a counter associated with each cache location of an unprivileged partition $N_{LRU}$=a set of counter values associated with privileged sub-partitions $N_{UR}$=a set of counter value lists associated with items that are requested but not available $C_{ALFU}$=a set of pieces of content in an unprivileged partition $C_{LRU}^k$=a set of pieces of content in a k-th privileged partition $C_{min}$=the content with the lowest counter value $C_{least}^k$=the least used content in a k-th privileged sub-partition v(i)=the popularity of i-th content N={$n_1, n_2, \ldots, n_m$}=a set of cache nodes $n_i^u$=an unprivileged partition $S_j$={$c_1, c_2, \ldots, c_n$}=a set of counter values that represent the states of caches at any instance j $c_i$=the i-th content in a network $\lambda_j$=a request arrival rate at $n_j$ $\tau_{ij}$=an arrival rate of a request for content $c_i$ within a window time W FIG. 2 is a flowchart that shows an in-network caching method according to an embodiment of the present invention. FIG. 3 is a view that shows the structure of a cache in an LFRU scheme according to an embodiment of the present invention. FIG. 4 is a view that shows an LFRU algorithm according to an embodiment of the present invention. FIG. 5 is a graph that shows a probability density function of a random variable according to an embodiment of the present invention.

Referring to FIG. 2, in the in-network caching method according to an embodiment of the present invention, first, content is received at step S210.

That is, at step S210, content may be received from a second node in response to a request from a first node.

Here, the first node indicates a consumer of the content or a router having a caching function, and may be 'Consumer $n_c$' in FIG. 1. The second node is a publisher having the content (Publisher $n_p$ in FIG. 1) or another router having a caching function.

Here, at step S210, the maximum delay time between a router having a caching function (Router $n_3$ in FIG. 1), which receives the content, and the second node, which provides the content, may be estimated.

That is, at step S210, a time window may be estimated by receiving the content.

Here, at step S210, the Zipf-like popularity of content distribution may be defined as Equation (1):

$$Z(i) = \frac{1}{\zeta(\alpha)i^\alpha} => Z(1) \geq Z(2) \geq \ldots Z(C) \quad (1)$$

$$\zeta(\alpha) = \sum_{i=1}^{C} \frac{1}{i^\alpha}$$

$$P(i, j) = \lambda_j \delta \cdot \frac{1}{\zeta(\alpha)i^\alpha}$$

where the typical value of α is 0.6~1.2, and ξ denotes a normalizing constant.

Assume that a time window is divided by a time window |W|, consisting of small δ intervals. If a request arrives according to Poisson with rate $\lambda_j$, the probability that a request arrives within the interval δ may be $\lambda_j\delta$.

Here, a content request rate of the subsequent interval δ may correspond to a request for the provided content $c_i$.

Here, in an array of random functions, $\tau_j(i)$ may be a Bernoulli Random Variable of content $c_i$ and may be defined as Equation (2):

$$\tau_j(i) = \begin{cases} 1 & \text{with } P(i, j) \\ 0 & \text{with } 1 - P(i, j) \end{cases} \quad (2)$$

Here, $\hat{\tau}_j$ may be an array of random variables acquired by calculating the success probability of $\tau_j$, and may be defined as $\hat{\tau}_j(i) = \Sigma\tau_j(i) \forall c_i$ in W.

Here, the expected value of $\hat{\tau}_j$ may be defined as Equation (3):

$$E(\hat{\tau}_j(i)) = \frac{|W|}{\zeta(\alpha)i^\alpha}\lambda_j\sum_{k=1}^{|W|}\delta_k \quad (3)$$

Also, the following Equation (4) may correspond to the expected number of requests for content $c_i$ in the time window W.

$$E(\hat{\tau}_j(i)) = \frac{|W|^2}{\zeta(\alpha)i^\alpha}\lambda_j \quad (4)$$

Here, the time window W may be estimated as shown in Equation (5):

$$|W| = \max\left\{\theta\left(|n_j|^3 \ln|n_j|\ln C \ln\frac{1}{\varepsilon}\right), \theta\left(|n_j|\ln^2 C \ln\frac{1}{\varepsilon}\right)\right\} \quad (5)$$

where $n_j$ denotes a cache size of the j-th node, C denotes the total number of pieces of content, and s denotes a constant that is greater than 0.

Here, the size of the time window may be estimated based on a confidence interval Conf and an acceptable error ε calculated using Chebyshev's inequality.

Here, estimation using Chebyshev's inequality may be defined as Equation (6):

$$P[|A_W(i) - E(\hat{\tau}_j(i))| \geq \varepsilon] \leq \frac{\sigma^2}{W\varepsilon^2} \leq \left(\frac{100 - Conf}{100}\right) \quad (6)$$

-continued $$\sigma = \sqrt{P(i, j)(1 - p(i, j))} \leq \frac{1}{2}$$

Here, $$A_W(i) = \frac{\sum E(\tau_j(i))}{W}$$

may be the average number of requests for content $c_i$ arriving in the last time window W.

Here, content $c_i$ may correspond to the most popular content in the time window W.

Accordingly, $\tau_j(i)$ may be calculated using a Bernoulli Random Variable and 0<P(i, j)<1.

Here, using Equation (6), the time window W may be additionally estimated as Equation (7):

$$W = \frac{100}{4\varepsilon^2(100 - Conf)} \quad (7)$$

However, because the estimated time window is not a tight boundary, a central limit theorem may be used to satisfy the tight boundary of the estimated time window.

$$Z_W = \frac{\hat{\tau}_j(i) - WE(\hat{\tau}_j(i))}{\sigma\sqrt{W}} \quad (8)$$

Also, using Equation (8), ($Z_W$)=0, which is a standard normal random variable of $Z_W$, and Var($Z_W$)=1 may be calculated.

$$P[|A_W(i) - E(\hat{\tau}_j(i))| \geq \varepsilon] \leq \frac{\sigma^2}{W\varepsilon^2} \approx P\left(|Z_W| \geq \frac{\varepsilon\sqrt{W}}{\sigma}\right) \quad (9)$$

$$P\left(|Z_W| \geq \frac{\varepsilon}{\sigma}\sqrt{W}\right) \leq P\left(|Z_W| \geq 2\varepsilon\sqrt{W}\right)$$

$$P\left(|Z_W| \geq 2\varepsilon\sqrt{W}\right) \leq \left(\frac{100 - Conf}{100}\right)$$

Also, through Equation (9), the time window may be calculated using a standard normal probabilities table for the acceptable error s and the confidence interval Conf.

Referring to FIG. 5, a probability density function for a random variable is represented in a graph. As shown in FIG. 5, when the value of $$\frac{300 - Conf}{200}$$

is q in the standard normal probabilities table, the time window may be estimated using Equation (10):

$$W = \frac{\sigma q}{\varepsilon} \quad (10)$$

Here, for more accurate estimation, function F(W) may be defined as Equation (11):

$$F(W) = E(\hat{\tau}_j(i)) - A_W(i) - \varepsilon \quad (11)$$

In Equation (11), because function F(W) is in the state in which the time window is unknown, 'Newton Method' may be used to find the value of the time window.

Here, in order to find an estimated time window value from Equation (11), 'Newton Iteration' may be performed on an estimated time window as shown in Equation (12) until an initially estimated value converges to a certain value.

$$W_{new} = W_{old} - \frac{F(W)}{F'(W)} \quad (12)$$

where, F' is the derivative of function F.

In the case of an in-network cache, the content of the cache rapidly changes, and the arrival rate of content may be affected by the number of requests for the content.

Accordingly, in order to satisfy $W \geq Avg(d_{jk}^{\ l} \forall c_l \notin C_j)$, the observation time of the time window may be selected as shown in Equation (13):

$$W_T = \max\left\{\frac{W}{\lambda_j}, Avg(d_{jk}^{\ l} \forall c_l \notin C_j)\right\} \quad (13)$$

Also, at steps S220 to S250, to be described later, operations may be performed based on the number of requests observed during the time window estimated at step S210.

Here, at step S210, the time taken to transmit content from the second node to a router having a caching function is applied to $Avg(d_{jk}^{\ l} \forall c_l \notin C_j)$ in Equation (13), whereby the maximum delay time may be estimated for the content transmitted between the router having a caching function and the second node.

If there is no content transmitted between the first node and the second node, the maximum delay time may be estimated using Equation (15).

Also, in the in-network caching method according to an embodiment of the present invention, Conditional Leave Copy Everywhere (CLCE) replication conditions may be checked at step S220 in order to determine whether to copy the received content into a cache.

Here, the cache for the content may be divided into a privileged partition and an unprivileged partition.

Here, the privileged partition may be configured with one or more sub-partitions.

Here, step S220 may be performed based on information such as the number of requests for content observed during a time window and the like.

Here, the time window may be estimated based on a confidence interval and an acceptable error calculated using Chebyshev's inequality.

Here, at step S220, the number of requests for the received content observed during the time window may be compared with the number of requests for the least requested content, among pieces of content in the unprivileged partition.

Also, when it is determined at step S220 that the number of requests for the received content is equal to or greater than the number of requests for the least requested content, priority may be checked at step S230.

Here, when it is determined at step S220 that the number of requests for the received content is less than the number of requests for the least requested content, the operation for the received content is terminated, and content subsequent thereto may be checked.

At step S230, for a specific element, the value of a priority function P for the received content may be compared with that for the content that is least requested during the time window, among pieces of content in the unprivileged partition.

Here, at step S230, the number of requests for content and a size of content may be incorporated in the priority function P, as shown in Equation (14):

$$P(c_i) = \frac{|c_i|}{|n_j|} * \frac{\sum N_{ALFU}}{\hat{\tau}_j(i)} \quad (14)$$

where $|c_i|$ denotes the size of the i-th content, $N_{AFLU}$ denotes a set value of a counter associated with each cache location of the unprivileged partition, $|n_j|$ denotes the cache size of the j-th node, and denotes an array of random variables including a random variable $\tau_j(i)$ acquired by calculating a success probability of a Bernoulli Random Variable of content $c_i$.

Here, when it is determined at step S230 that the value of the priority function P for the received content is greater than that for the least requested content, a partition may be checked at step S240.

Here, if the result of the priority check at step S230 indicates that the value of the priority function P for the received content is less than that for the least requested content, the operation for the received content is terminated, and content subsequent thereto may be checked.

Here, the priority function P may be a composite function that is generated by combining functions that are independent of each other, in which the requirements of the administrator of a local network are incorporated.

That is, at step S240, content to be replaced with the received content may be selected from among content in the privileged partition and content in the unprivileged partition.

Here, at step S240, first, within the time window, whether the number of requests for the received content falls within a range between the minimum value and the maximum value of the number of requests for pieces of content in the unprivileged partition is determined.

Here, if it is determined at step S240 that the number of requests for the received content is greater than the maximum value of the number of requests for pieces of content in the unprivileged partition, the operation of selecting a sub-partition in the privileged partition is performed, but if not, a cache replacement operation for replacing to content in the unprivileged partition may be performed at step S250.

That is, at step S250, an Approximated Least Frequently Used (ALFU) scheme is performed in order to select content from among pieces of content cached in the unprivileged partition, and the selected content may be replaced with the received content.

Here, the ALFU may correspond to a Least Frequently Used (LFU) scheme based on a history of access to content, such as information about the number of requests for content observed during the time window.

Here, at step S250, the operation of selecting a sub-partition may be configured such that a sub-partition having the feature that is most similar to that of the received content is selected from among sub-partitions constituting the privileged partition, and a cache replacement operation for replacing specific content stored in the selected sub-partition may be performed.

Here, the feature is a normalized value acquired by dividing the total number of requests for pieces of content stored in each sub-partition, observed during the time window, by the number of pieces of content stored in the corresponding sub-partition.

Here, at step S250, the least recently used content, selected from among pieces of content stored in the selected sub-partition by performing the Least Recently Used (LRU) scheme thereon, may be moved to the unprivileged partition, and the received content may be cached in the space of the selected sub-partition, in which the least recently used content was cached.

Here, the operation of moving the least recently used content to the unprivileged partition may be configured such that content selected from among pieces of content stored in the unprivileged partition by performing the ALFU scheme thereon is replaced with the least recently used content.

That is, step S250, the LRU scheme may be applied to the privileged partition, and the ALFU scheme may be applied to the unprivileged partition.

Referring to FIG. 3, the structure of an in-network cache according to an embodiment of the present invention is depicted as being separated into a privileged partition and an unprivileged partition.

The size of the unprivileged partition may be small enough to reduce management costs for monitoring a counter value for each memory location, and may be large enough to maximize a cache-hit probability.

The privileged partition is further divided into K sub-partitions.

Here, at steps S240 and S250 illustrated in FIG. 2, the privileged partition is divided into multiple sub-partitions, and the total number of observations of sub-partitions during the time window may be counted.

Here, all of the sub-partitions of the privileged partition may be monitored so as to count the total number of cache hits observed from a specific partition area within the time window W.

Here, at step S240, a history of access to content within a limited time window may be maintained using the ALFU scheme.

According to an embodiment of the present invention, for a fixed size of privileged partition, increasing the number of partitions may make frequently used content converge on the same partition.

In a broad sense, if each privileged partition is considered as a box that represents a single large memory location, it may correspond to a high-frequency item of the ALFU.

If K=|Size of Privileged partition|, the LFRU scheme may correspond to the ALFU scheme.

Here, at step S250, cache replacement for the received content may be performed based on the LFRU algorithm, which combines the LRU scheme with the ALFU scheme.

That is, at steps S240 and S250, the selection of a partition and cache replacement may be performed using the number of requests for the received content, the maximum normalized number of requests in the privileged partition, and the minimum normalized number of requests in the unprivileged partition.

FIG. 4 shows the LFRU algorithm according to an embodiment of the present invention.

The LFRU algorithm is configured based on three conditions. A simple description of each phase is as follows.

At the first phase of the LFRU algorithm, two conditions may be checked based on information observed within a time window $W_T$. If the number of requests for content $c_i$ is equal to or greater than the number of requests for the least requested content $\min(N_{ALFU})$ among pieces of content in the unprivileged partition and if the content c has priority (determined by a composite function P defined by a local administrator) higher than the priority of the least requested content among the pieces of content in the unprivileged partition, it is confirmed that the content $c_i$ may be replicated to the cache and the second phase may be performed. If either of the two conditions is not satisfied, the content is not replicated to the cache, and subsequent content may be checked.

At the second phase of the LFRU algorithm, if the number of requests for the content $c_i$ is equal to or greater than the minimum number of requests for pieces of content in the unprivileged partition and is equal to or less than the maximum number thereof, content $c_{min}$ in the unprivileged partition, which corresponds to the minimum number of requests, may be replaced with the content $c_i$.

At the third phase of the LFRU algorithm, if the number of requests for the content $c_i$ is greater than the maximum number of requests for pieces of content in the unprivileged partition, a sub-partition having the lowest acceptable error $\varepsilon_0$ may be selected from among sub-partitions of the privileged partition.

Here, at the third phase, content $c_{least}^k$, which is least frequently used during the time window, is pushed from the sub-partition having the lowest acceptable error into the unprivileged partition, whereby the least frequently used content $c_{least}^k$ may replace content $c_{min}$, which corresponds to the minimum number of requests during the time window in the unprivileged partition.

Finally, at the third phase, the content $c_i$ may be inserted in the privileged partition from which the least frequently used content $c_{least}^k$ was evicted.

Here, at the first phase, the priority of content may be determined by a composite function $P(c_i)=f_0{}^\circ f_1{}^\circ f_2 \ldots {}^\circ f_k$. Here, functions $f_0{}^\circ f_1{}^\circ f_2 \ldots {}^\circ f_k$, are independent of each other, and may be defined and managed by a local administrator by incorporating application-specific and operator-related control and business model requirements.

For example, in the CDN, content may be cached for a specific content provider having a commercial relationship with a CDN service provider. However, in the ICN, content may be divided into two categories, which are neutral content and content of a publisher having a commercial relationship with a cache owner. Commercial caches grant higher priority to commercial content, and may provide a caching service to neutral content only when the cache has available space. However, in the case of an edge ISP network, customer satisfaction may be very important. Accordingly, a cache in the local ISP may be neutral, and a replication priority function may be defined in order to enhance the customers' Quality of Experience (QoE) and the utilization of caches. In either case, in addition to the CLCE replication conditions, the replication scheme may also be affected by the locally defined priority function P in Equation (14).

Also, in the in-network caching method according to an embodiment of the present invention, content may be transmitted at step S260.

That is, the cached content may be transmitted at step S260. Also, when cache replacement is not necessary, the content may be transmitted without being cached at step S260.

Here, at step S260, if the intermediate cache node, in which the in-network caching apparatus 100 is located, has no copy of content $C_r$, the maximum delay may be calculated as shown in Equation (15):

$$d_{ij}(k) = \sum_{n=1}^{k} d_{ij}^{max}(k) P_h^r(n) \prod_{m=1}^{n} (1 - P_h^r(m)) \quad (15)$$

Here, at step S260, if there is no history of content transmission between the first node and the second node, the maximum delay time may be calculated using Equation (15), rather than using $\text{Avg}(d_{jk}^{i} \forall c_l \notin C_j)$ of Equation (14).

Here, the theoretical maximum delay between an arbitrary node n and another arbitrary node $n_j$ may be represented using $d_{ij}^{max}(k)$.

Here, k may be the total number of pieces of content requested between an arbitrary node $n_i$ and another arbitrary node $n_j$.

Figure 6:
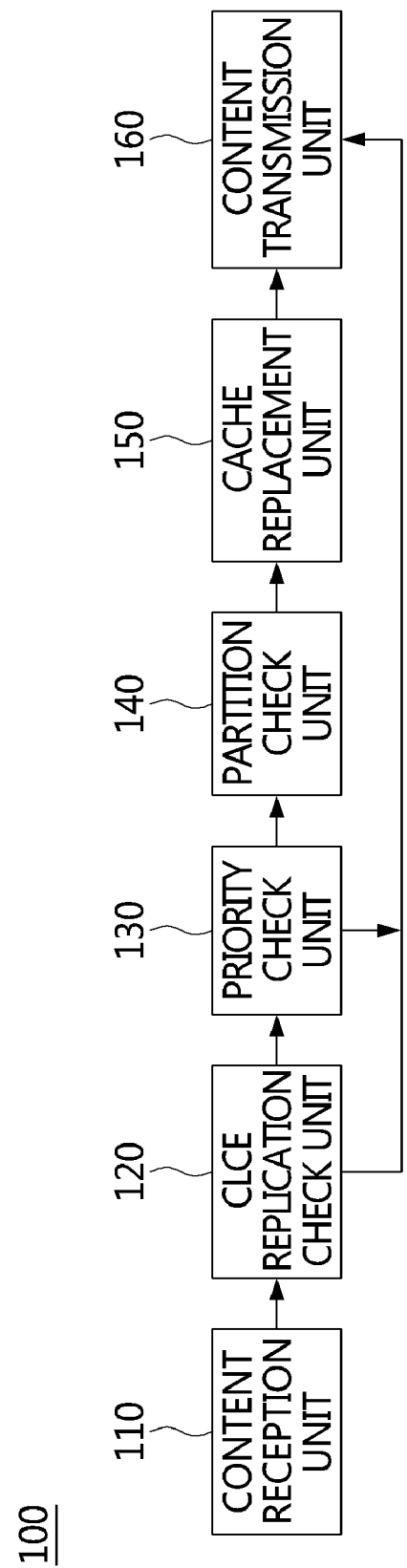
FIG. 6 is a block diagram that shows an apparatus for in-network caching according to an embodiment of the present invention.

FIG. 6 is a block diagram that shows an in-network caching apparatus according to an embodiment of the present invention.

Referring to FIG. 6, the in-network caching apparatus according to an embodiment of the present invention includes a content reception unit 110, a CLCE replication check unit 120, a priority check unit 130, a partition check unit 140, a cache replacement unit 150, and a content transmission unit 160.

The content reception unit 110 may perform the above-described step S210.

The CLCE replication check unit 120 may perform the above-described step S220.

The priority check unit 130 may perform the above-described step S230.

The partition check unit 140 may perform the above-described step S240.

The cache replacement unit 150 may perform the above-described step S250.

The content transmission unit 160 may perform the above-described step S260.

Also, an embodiment of the present invention may be implemented in a computer system such as a computer-readable recording medium. The computer system may include one or more processors, memory, a user interface input device, a user interface output device, and storage, which communicate with each other via a bus. Also, the computer system may further include a network interface connected with a network. The processor may be a central processing unit or a semiconductor device for executing processing instructions stored in the memory or the storage. The memory and the storage may be various types of volatile or nonvolatile storage media. For example, the memory may include ROM or RAM.

The content reception unit 110 may include a first network interface and a first processor.

Here, the first network interface may perform step S210.

Here, the first processor may receive the content, which is received at step S210, and may temporarily store the same in memory.

The CLCE replication check unit 120 may correspond to a second processor.

Here, the second processor may perform step S220.

The priority check unit 130 may correspond to a third processor.

Here, the third processor may perform step S230.

The partition check unit 140 may correspond to a fourth processor.

Here, the fourth processor may perform step S240.

The cache replacement unit 150 may correspond to a fifth processor.

Here, the fifth processor may perform step S250.

Here, the fifth processor may cache the copy of the content to the storage as the result of performance of step S250.

The content transmission unit 160 may correspond to a second network interface.

Here, the second network interface may perform step S260.

The present invention may provide a lightweight and efficient mechanism for cache replication and replacement schemes for in-network caches.

Also, the present invention may provide a satisfactory Internet environment to users by decreasing network traffic.

Also, the present invention may minimize the cost of managing and monitoring a cache network.

As described above, the in-network caching apparatus and method according to the present invention are not limitedly applied to the configurations and operations of the above-described embodiments, but all or some of the embodiments may be selectively combined and configured, so that the embodiments may be modified in various ways.

What is claimed is:

1. A method for in-network caching using an in-network caching apparatus, comprising:
   receiving content at a cache comprising an unprivileged portion and a privileged portion from a second node in response to a request from a first node;
   checking a Conditional Leave Copy Everywhere (CLCE) replication condition to confirm that the content is copied based on a number of requests for the content;
   checking a priority condition based on a result value of a priority function for the content;
   checking a partition for the content depending on the number of requests for the content;
   performing a cache replacement operation for the content depending on a result of checking the partition for the content by replacing least requested content in the unprivileged partition with the content when a number of requests for the content falls within a range between a minimum value and a maximum value of a number of requests for pieces of content in the unprivileged partition; and
   transmitting the content to the first node.

2. The method of claim 1, wherein receiving the content is configured to estimate a time window for the content based on a confidence interval and an acceptable error, calculated using Chebyshev's inequality.

3. The method of claim 2, wherein receiving the content is configured to use a central limit theorem in order to satisfy a tight boundary of the time window.

4. The method of claim 2, wherein receiving the content is configured such that, in order to improve accuracy of estimation of the time window, Newton iteration is performed on the time window, estimated using a Newton method.

5. The method of claim 1, wherein checking the CLCE replication condition is configured such that the CLCE replication condition is satisfied when the number of requests for the content is equal to or greater than a number of requests for the least requested content, among pieces of content in the unprivileged partition.

6. The method of claim 1, wherein checking the priority condition is configured such that the priority condition is satisfied when the result value of the priority function for the content is greater than a result value of the priority function for content having a lowest number of requests among pieces of content in the unprivileged partition.

7. The method of claim 1, wherein checking the partition is configured to select any one of the privileged partition and the unprivileged partition for caching the content.

8. The method of claim 1, wherein performing the cache replacement operation is configured to select content by performing a Least Recently Used (LRU) scheme on pieces of content cached in the privileged partition, and to replace other content, cached in the unprivileged partition, with the selected content.

9. The method of claim 8, wherein performing the cache replacement operation is configured such that the cache replacement operation is performed by performing an Approximated Least Frequently Used (ALFU) scheme on pieces of content cached in the unprivileged partition.

10. The method of claim 9, wherein performing the cache replacement operation is configured such that, when the number of requests for the content is equal to or greater than the number of requests for the least requested content among pieces of content in the unprivileged partition and when the priority of the content is higher than a priority of the least requested content, a Least Frequently Recently Used (LFRU) scheme is performed.

11. The method of claim 10, wherein the LFRU scheme is configured such that the LRU scheme is applied to the privileged partition and the ALFU scheme is applied to the unprivileged partition.

12. The method of claim 9, wherein performing the cache replacement operation is configured to maintain a history of access to the content within a limited time window using the ALFU scheme.

13. The method of claim 12, wherein performing the cache replacement operation is configured to divide the privileged partition into multiple sub-partitions and to count a total number of observations of the sub-partitions within the time window.

14. The method of claim 13, wherein performing the cache replacement operation is configured to select a sub-partition having a lowest acceptable error from among the sub-partitions of the privileged partition when the number of requests for the content is greater than a maximum number of requests for pieces of content in the unprivileged partition.

15. The method of claim 14, wherein performing the cache replacement operation is configured to replace content corresponding to a minimum number of requests in the unprivileged partition with least frequently used content evicted from the sub-partition having the lowest acceptable error.

16. The method of claim 15, wherein performing the cache replacement operation is configured to insert the content, corresponding to the number of requests greater than the maximum number of requests for pieces of content in the unprivileged partition, in the privileged partition from which the least frequently used content is evicted.

17. The method of claim 13, wherein performing the cache replacement operation is configured such that a number of requests for the content in the time window is estimated using the number of requests for the content and a Bernoulli Random Variable for the content.

18. An in-network caching apparatus, comprising:
a content interface that receives content at a cache comprising an unprivileged portion and a privileged portion from a second node in response to a request from a first node;
a processor that checks a Conditional Leave Copy Everywhere (CLCE) replication condition to confirm that the content is copied based on a number of requests for the content;
the processor configured to check a priority condition based on a result value of a priority function for the content;
the processor configured to check a partition depending on the number of requests for the content;
the processor configured to perform a cache replacement operation for the content depending on a result of checking the partition for the content by replacing least requested content in the unprivileged partition with the content when a number of requests for the content falls within a range between a minimum value and a maximum value of a number of requests for pieces of content in the unprivileged partition; and
the content interface configured to transmit the content to the first node.

* * * * *